United States Patent [19]
Whitehead

[11] Patent Number: 5,715,347
[45] Date of Patent: Feb. 3, 1998

[54] HIGH EFFICIENCY PRISM LIGHT GUIDE WITH CONFOCAL PARABOLIC CROSS SECTION

[75] Inventor: Lorne A. Whitehead, Vancouver, Canada

[73] Assignee: The University of British Columbia, Vancouver, Canada

[21] Appl. No.: 542,164

[22] Filed: Oct. 12, 1995

[51] Int. Cl.⁶ .................................................. G02B 6/00
[52] U.S. Cl. .......................... 385/133; 385/146; 385/147; 385/901; 359/858; 362/32
[58] Field of Search .................................. 385/133, 146, 385/147, 901; 362/32; 359/858, 861

[56] References Cited

U.S. PATENT DOCUMENTS

| | | | |
|---|---|---|---|
| 3,532,417 | 10/1970 | Tiemann | 359/858 |
| 3,923,381 | 12/1975 | Winston | 350/293 |
| 4,120,565 | 10/1978 | Rabl | 350/292 |
| 4,260,220 | 4/1981 | Whitehead | 385/901 X |
| 4,750,798 | 6/1988 | Whitehead | 385/146 |
| 4,787,708 | 11/1988 | Whitehead | 385/146 |
| 4,805,984 | 2/1989 | Cobb, Jr. | 385/133 |
| 5,309,544 | 5/1994 | Saxe | 385/901 X |
| 5,339,382 | 8/1994 | Whitehead | 385/146 |

FOREIGN PATENT DOCUMENTS

| | | |
|---|---|---|
| A 235447 | 9/1987 | European Pat. Off. . |
| A 290267 | 11/1988 | European Pat. Off. . |

OTHER PUBLICATIONS

Whitehead, L.A., Nodwell, R.A. Curzon, F.L., New Efficient Light Guide for Interior Illumination, Applied Optics, vol.21, No.15, Aug. 1, 1982.

Saxe, S.G., Whitehead, L.A., Cobb Jr., S., Progress in Development of Prism Light Guides, SPIE Proceedings, vol. 692, pp.235–240, 1984 No Month.

Whitehead, L.A., Scott, J.E., Distribution of Light with Prism Light Guides, IES Proceedings, Aug. 1984.

*Primary Examiner*—Phan T. H. Palmer
*Attorney, Agent, or Firm*—Oyen Wiggs Green & Mutala

[57] ABSTRACT

A hollow light guide with opposed first and second parallel sections having confocal, parabolic cross-sectional shape. The light guide may be a prism light guide, or other hollow light guide such as a metallic mirror light guide or a multi-layer dielectric light guide. The cross-sectional shapes have vertices separated by a distance which does not exceed about three times (preferably, about 2.5 times) the focal length of the shapes.

13 Claims, 6 Drawing Sheets

HIGH EFFICIENCY PRISM LIGHT GUIDE WITH CONFOCAL PARABOLIC CROSS SECTION

FIELD OF THE INVENTION

This application pertains to construction of prism light guides having cross sections consisting of confocal opposed parabolic sections. Such guides are able to localize the transverse motion of light rays, such that the seams at the intersections of the parabolas do not attenuate most light rays propagated within the guide.

BACKGROUND OF THE INVENTION

Many illuminating engineering devices incorporate prism light guides for transporting light from one place to another and for distributing light along a linear expanse. See for example U.S. Pat. No. 4,260,220 Whitehead "Prism Light Guide Having Surfaces Which are in Octature" issued Mar. 30, 1982; and, Whitehead, L. A., Nodwell, R. A. Curzon, F. L., "New Efficient Light Guide for Interior Illumination", Applied Optics, Vol. 21, No. 15, Aug. 1, 1982. In essence, such guides are hollow pipes made of transparent material, in which one or more of the pipe's surfaces contain longitudinal prisms which cause light travelling predominantly within the pipe's inner air space to be reflected by total internal reflection whenever it encounters the pipe's outermost surface.

In most such guides, the inner surface is smooth, and the prisms on the outer surface are right angle isosceles triangles in cross section, running parallel to the axis of the guide. Generally, such guides are formed of flexible prismatic sheet (see Saxe, S. G., Whitehead, L. A., Cobb Jr., S., "Progress in Development of Prism Light Guides", SPIE Proceedings, Vol. 692, pp. 235–240, 1984) and the guide itself is housed within a protective outer structure to keep it clean and to prevent abrasion of the optical quality surfaces.

Prism light guides can be made in a wide variety of cross sections, all of which are capable of guiding with low loss all incident light rays whose angular deviation, θ, from the guide axis, is less than a value $\theta_c$ where $\theta_c$ depends on the refractive index n, of the pipe material, in the following manner:

$$\theta_c = \arccos\sqrt{\frac{4 - n^2(2 - \sqrt{2})}{2 + \sqrt{2}}} \quad (1)$$

As would be expected, a key property of the prism light guide is its loss rate, which is best expressed as the attenuation of the guided light per average reflection of a light ray off the wall material. The only unavoidable loss is caused by diffraction, which is believed to be of order $10^{-3}$ although this has not yet been confirmed. In current prism light guides, the intrinsic loss per reflection is roughly 2%, and results from very slight imperfections in the shape of the prisms. Since this loss primarily consists of escaping light which can be used for illumination, the prism light guide is an efficient and useful tool for light distribution (see U.S. Pat. No. 4,750,798 Whitehead Prism Light Guide Luminaire" Oct. 7, 1986; U.S. Pat. No. 4,787,708 Whitehead "Apparatus for Continuously Controlled Emission of Light from Prism Light Guide" Nov. 1, 1988; and, Whitehead, L. A., Scott, J. E., "Distribution of Light with Prism Light Guides", IES Proceedings, August 1984).

In most cases, prism light guides are made with simple cross sectional shapes, since these are easiest to fabricate. For example, circular cross sections are common, as are rectangles, triangles and their various combinations. Generally, a prism light guide is formed of flat prismatic film, which is bent or otherwise assembled into the desired shape. Unfortunately, the simplest methods of fabrication often introduce imperfections at the resultant seams. The present invention reduces the attenuation caused by such imperfections and thereby increases the useful distance over which light can be piped.

SUMMARY OF THE INVENTION

In accordance with the preferred embodiment, the invention provides a hollow light guide with opposed first and second parallel sections having confocal, parabolic cross-sectional shape. The light guide may be a prism light guide, or other hollow light guide such as a metallic mirror light guide or a multi-layer dielectric light guide.

Advantageously, the cross-sectional shapes have vertices separated by a distance which does not exceed about three times (preferably, about 2.5 times) the focal length of the shapes.

The invention also provides a method of making a hollow light guide in which light guide wall material is formed into first and second light guide sections, with each section having parabolic cross-sectional shape. The sections are joined together while the parabolic cross-sectional shapes are maintained confocal with one another. During the joining step, the parabolic vertices of the shapes are maintained at a separation distance which does not exceed about three times (preferably, about 2.5 times) the focal length of the shapes.

DETAILED DESCRIPTION OF THE PREFERRED EMBODIMENT

Figure 1A:
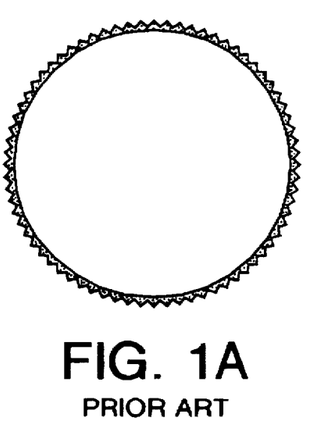
FIGS. 1(a) and 1(b) are respectively cross-sectional and isometric illustrations of a prior art prism light guide having a circular cross section.
Figure 1B:
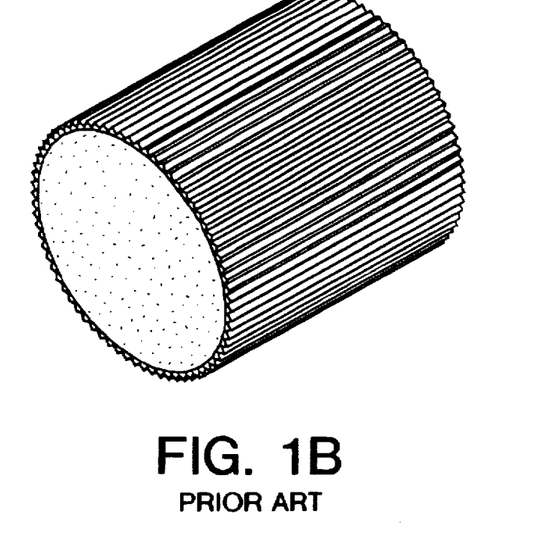
Figure 2:
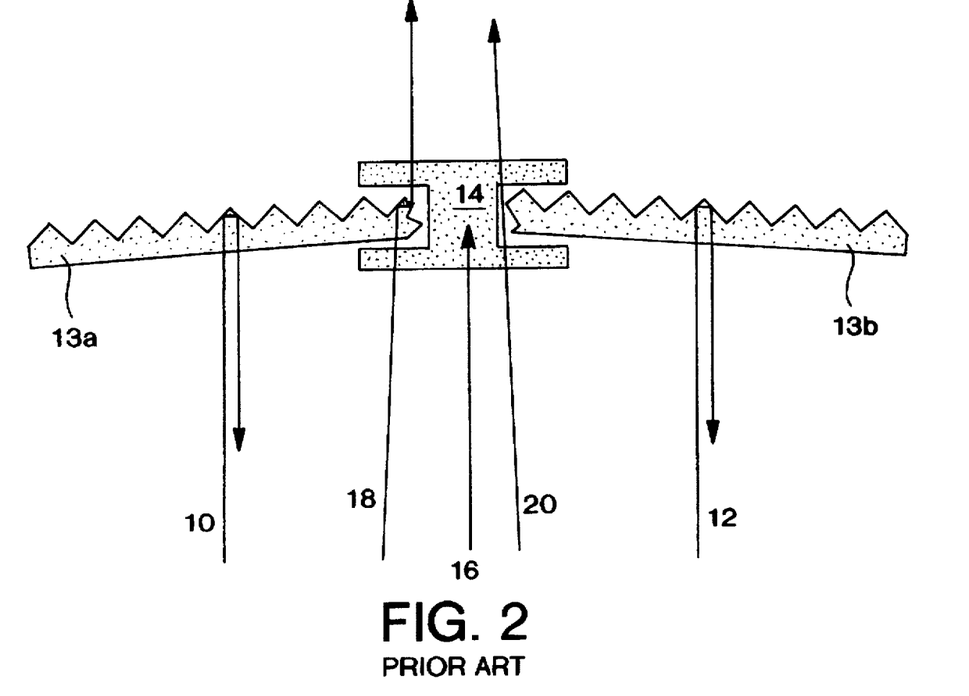
FIG. 2 shows an enlarged example of a prior art prismatic film seam, depicting loss due to intrinsic edge imperfections, gaps, and fastening materials.

FIGS. 1(a) and 1(b) depict a simple prior art prism light guide of circular cross-section. As mentioned above, such guides are conventionally formed of flat prismatic film, which is bent or otherwise assembled into the desired shape by joining opposed edges of the prismatic film material along a seam. FIG. 2 shows an enlarged example of such a seam, depicting loss due to intrinsic edge imperfections, gaps, and fastening materials. In particular, light rays 10, 12 are totally internally reflected by the prismatic wall material sections 13a, 13b; seam connector 14 absorbs light ray 16; light ray 18 escapes the light guide due to scattering at the imperfect edge of wall material 13a; and, light ray 20 escapes through the gap between connector 14 and the edge of wall material 13b. Although steps can be taken to reduce the impact of such losses, they increase the complexity and hence the cost of the assembly procedure, and none of them are perfect. It is very desirable to minimize the optical effect of such seams.

Figure 3:
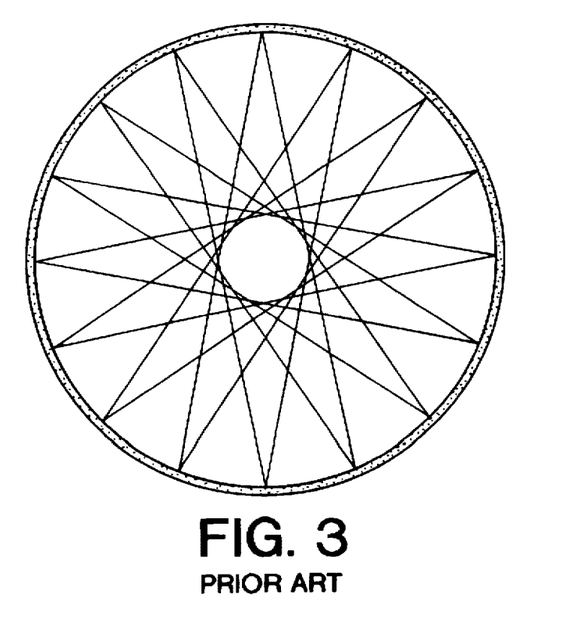
FIG. 3 is a graphical plot showing transverse motion of a light ray propagated within a prior art circular metallic mirror light guide.

In this regard, it is necessary to understand a key optical property of the propagation of light rays in the cross sectional direction as they travel along a light guide. FIG. 3 plots the transverse motion of a light ray propagated within a circular guide having mirrored walls. As can be seen, a general ray, which commences from a position off the guide axis, undergoes a reflective path which "drifts" around the cross section of the guide. Thus, as the ray propagates along the guide it will interact with all portions of the perimeter of the guide.

Figure 4:
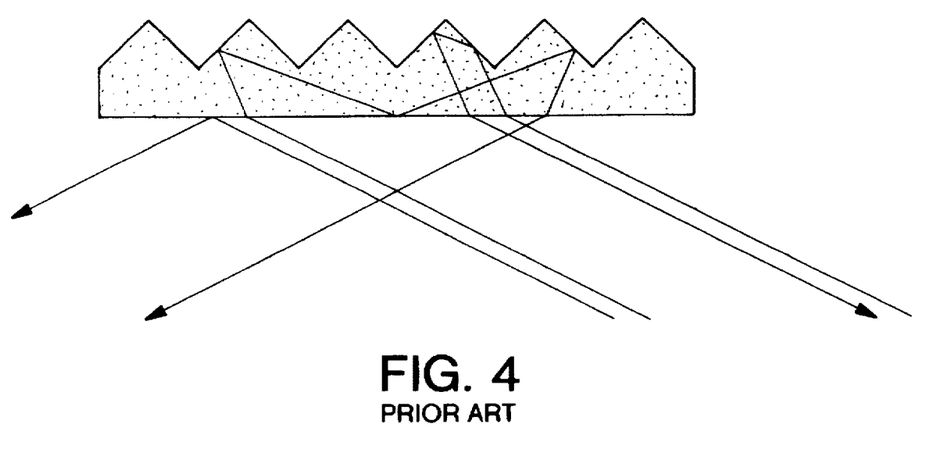
FIG. 4 is a graphical plot depicting the two different reflection directions for transverse motion of light rays striking a prior art prism light guide wall.

In the case of a prism light guide, there are two reflected directions for light rays, as shown in FIG. 4. One of these directions is retro-reflective with respect to the ray's transverse motion, but in practice roughly half the reflected energy lies in the non-retro-reflective direction, and so the transverse drift observed in FIG. 3 still occurs, although at a somewhat slower rate.

The transverse drift of propagating light rays is largely responsible for the fact that the seams mentioned above cause substantial losses. If the rays did not drift around the cross section, only a very small portion of the light in the guide would encounter the seams. If this were the case, although all such rays would escape from the guide, their loss would be only a small fraction of the total flux, and the remaining light would propagate efficiently without encountering the seams. In reality, because the transverse drift does occur, the effect of the seams is to cause a continual attenuation of all light rays, which reduces the useful distance light can be piped.

Figure 5:
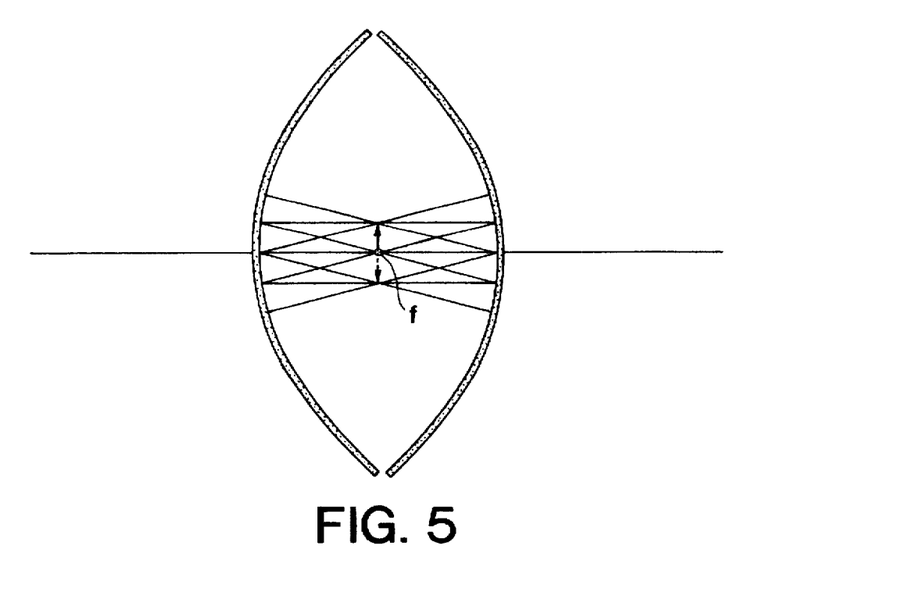
FIG. 5 depicts transverse motion of light rays within a confocal parabolic cross-sectioned light guide.

FIG. 5 depicts an alternate light guide cross section, consisting of two sections of parabolas which are confocal (i.e. share a common focus f). As shown, light rays which are slightly off axis do not drift around the cross section, but instead retrace their original path. This is true for both conventional mirrored wall and also for prism light guide wall material. In the case of a prism light guide, the transverse retro-reflected rays automatically retrace their paths, and the conventionally reflected rays behave in the same manner as shown in FIG. 5.

Light guides having the cross section depicted in FIG. 5 thus have the potential to be substantially free from attenuation resulting from imperfect seams at the joints of the two parabolic sections. In practice, however, it is important to note that the simplified paraxial ray tracing analysis depicted in FIG. 5 will be precisely true only for light rays which are infinitesimally removed from the light guide's central longitudinal axis. For light rays which originate substantially off axis, one would expect the well known aberrations associated with parabolic reflectors to introduce imperfections in the ray paths, preventing rays from precisely re-tracing their cross sectional path.

However, even in the case where the ray originates off-axis, it is possible that the resultant transverse deflections may be bounded such that a ray which does not originally encounter a seam will be unlikely to ever do so. This aspect of the invention is conveniently analyzed by conducting a computerized ray tracing of a computer-simulated light guide, as is now explained.

For conventional mirror-wall light guides, any standard ray tracing technique could be used. But, in the case of prism light guides, it is important to take into account the actual behaviour of the prism light guide wall material. Because every interaction of a light ray with the wall material produces several rays of similar energy, the number of rays which must be traced increases exponentially. The solution is to use a Monte Carlo method, in which only one ray is traced after each interaction, with the probability of a given ray being selected being proportional to its energy. Using this technique, prism light guides having both confocal parabolic and circular arc cross sections were modeled. Slight spacing variations between the cross sections forming the light guide were also modelled to see if they could perform better for rays which were substantially off-axis.

Such investigations showed that the confocal parabolic cross section is substantially better than one based on circular arcs. Moreover, it was found that the two parabolas need not be precisely confocal in their spacing. As long as the distance between the parabola vertices does not exceed three times the focal length, (in comparison to twice the focal length in the confocal case), the behaviour is mainly unchanged; and, is essentially unchanged if the distance between the parabola vertices does not exceed about 2.5 times the focal length. An intuitive way to think of the operation of the two parabolas is that one converts light diverging from a given point into parallel rays, and the other parabola then converges these to a point equidistant on the other side of the axis, such that the process can repeat itself. This is true regardless of whether or not the parabolas are confocal, but when they are close to confocal certain aberrations tend to cancel, resulting in better performance. If the parabola spacing exceeds three times the focal length, the rays become unstable in their transverse propagation. This is not surprising, as the case where the spacing is four times the focal length is optically analogous to the circular case.

Figure 6A:
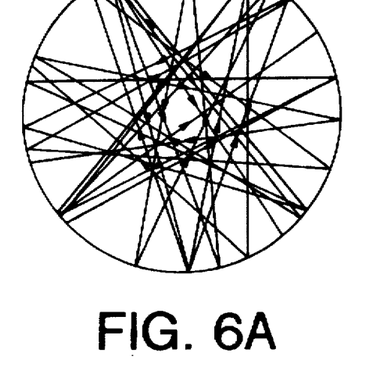
FIGS. 6(a) and 6(b) are respectively graphical plots showing transverse motion of light rays propagated within circular and confocal parabolic cross-sectioned prism light guides.
Figure 6B:
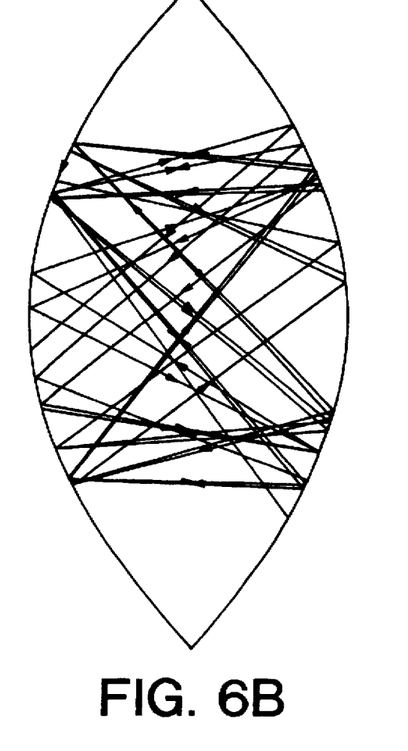

FIGS. 6(a) and 6(b) are respectively typical plots of the actual cross sectional evolution of light rays propagated within the circular and confocal parabolic cross section structures. As can be seen, the parabolic cross section does indeed substantially reduce the transverse drift of the light ray.

Figure 7A:
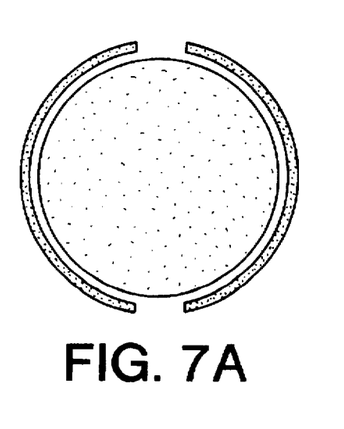
FIGS. 7(a) and 7(b) respectively depict the cross-sectional layout of ideal circular and confocal parabolic prism light guide sections modelled in a computer-simulated comparison.
Figure 7B:
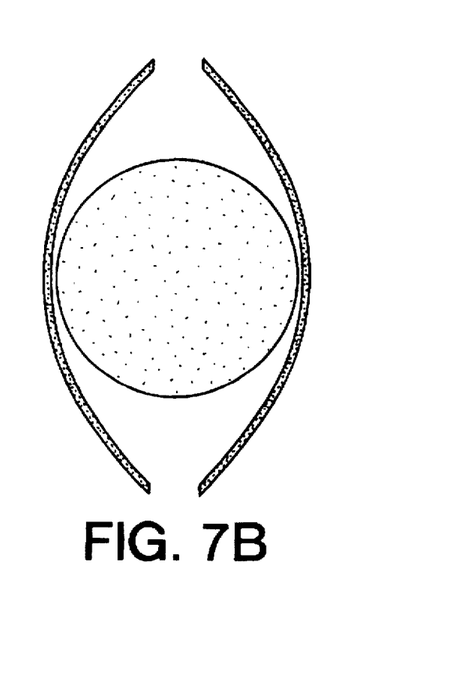
Figure 8:
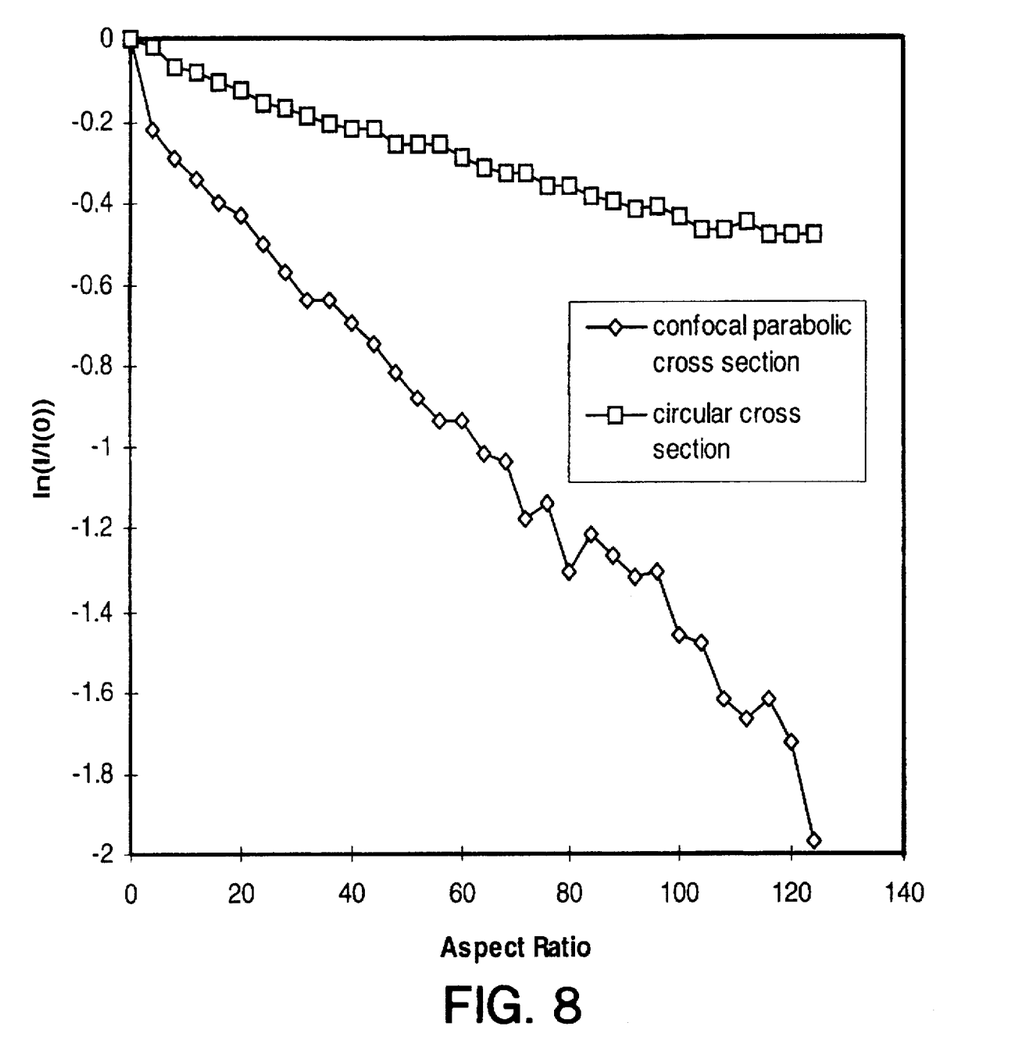
FIG. 8 is a graphical plot showing computer-simulated decay of light intensity as a function of distance for light rays traversing the idealized circular and confocal parabolic prism light guide sections of FIG. 7.

FIGS. 7(a) and 7(b) respectively show the cross sectional layout for a circular cross section prism light guide, and for a confocal parabolic cross section, each with identical gaps at two seams. Both guides have the same width and light entrance aperture as shown. In both cases, a Monte Carlo model was used to simulate input light which is partially collimated to within an angle of 15 degrees from the axial direction, which is typical of many high aspect ratio light guide applications. FIG. 8 is a graph of the natural logarithm of the flux remaining in the guides as a function of distance to width ratio (i.e. aspect ratio). As can be seen, both guides show an initial drop in flux associated with the loss of rays which immediately encounter the gaps, but subsequently the loss rate of the parabolic guide is substantially reduced relative to the circular guide.

These results were encouraging, but the aforementioned computer simulation does not account for certain imperfections which would be expected in an actual light guide. For example, the cross sectional shape of an actual prism light guide varies somewhat along the length of the guide, and will not be precisely parabolic. Rather than estimating the magnitudes of such errors, they were directly evaluated, as is now explained.

Figure 9:
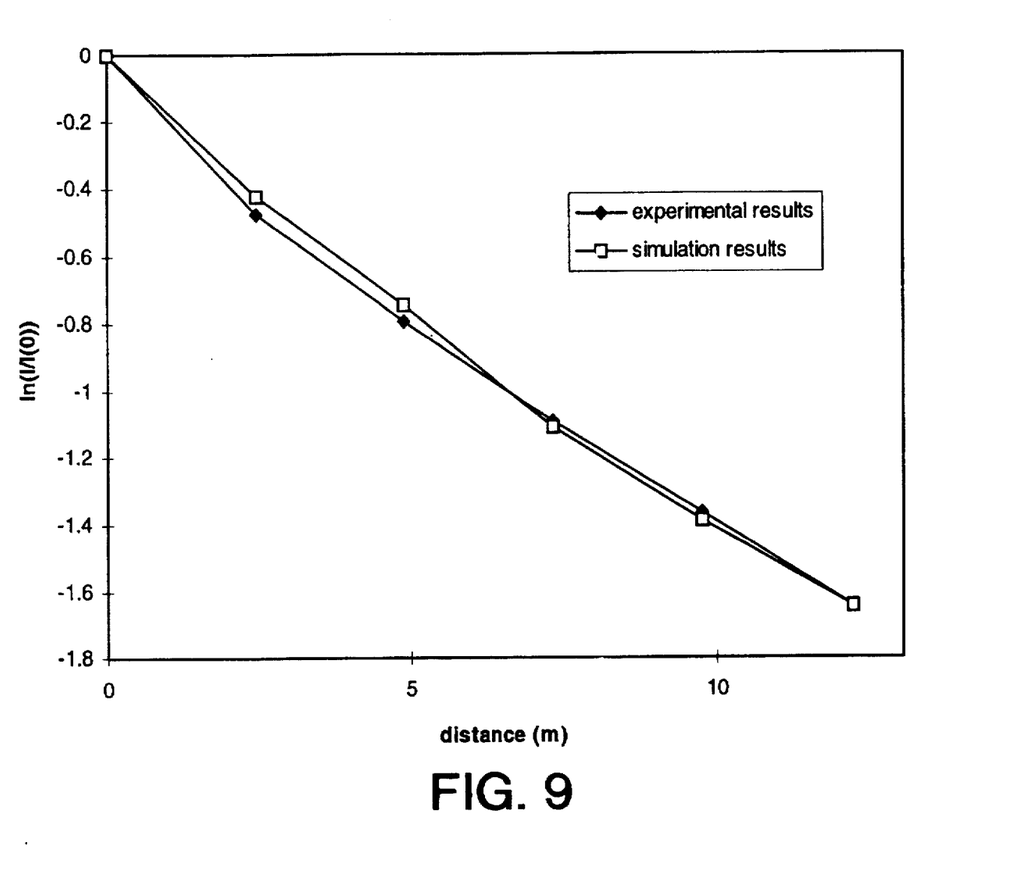
FIG. 9 is a graphical plot showing decay of light intensity as a function of distance for light rays traversing a 100 mm wide confocal parabolic light guide, with two 20 mm gaps in the perimener, and the corresponding predicted decay for a Monte Carlo ray tracing model of the same guide.

A light guide was constructed with a confocal parabolic cross section as depicted in FIG. 7(b), with a width (i.e. 2f) of 100 mm, and with a gap of 20 mm at the top and bottom. The parabolic surfaces were formed by deforming flat prismatic sheet film material against parabolic shaped edges of rigid material. These parabolic edges were positioned every 1.25 m along the guide, and the resultant cross section had dimensional errors of approximately ±1 mm, which is thought to be typical of errors which would be encountered in ordinary applications. FIG. 9 shows a graph of the natural logarithm of the experimentally observed flux as a function of distance along the guide. FIG. 9 also shows a prediction from the Monte Carlo computer simulation ray tracing model, in which the only non-geometric loss included is the scattering of light by the prism light guide wall material. The reasonable agreement between these two results demonstrates that the design concept is valid and is relatively insensitive to modest imperfections in the assembly accuracy of the prism light guide.

It can thus be seen that a prism light guide whose surface cross section consists of approximately confocal opposed parabolic sections has important advantages. Such guides are able to localize the transverse motion of light rays, such that the seams at the intersections of the parabolas do not affect most light rays propagated within the guide. This is a unique advantage relative to the cross sectional design of prior art light guides. The invention thus facilitates light guide assembly techniques involving larger seams and/or joints between sections of prism light guide wall material, in order facilitate manufacturing.

As will be apparent to those skilled in the art in the light of the foregoing disclosure, many alterations and modifications are possible in the practice of this invention without departing from the spirit or scope thereof. For example, in addition to its application to prism light guides, the invention can be applied to other hollow light guides such as metallic mirror light guides or multi-layer dielectric light guides. As another example, although it will generally be desirable for the two parabolic light guide sections to have approximately equal focal lengths, small variations in focal length are acceptable. Further, light guides constructed in accordance with the invention need not have precisely confocal, precisely parabolic cross-sectional shape; significant benefits can be attained with substantially confocal and/or substantially parabolic cross-sectional shape. Accordingly, the scope of the invention is to be construed in accordance with the substance defined by the following claims.

What is claimed is:

1. A hollow light guide comprising opposed first and second parallel sections, said sections having substantially confocal, substantially parabolic cross-sectional shape overlappingly enclosing a light guiding region, said shape having substantially constant cross-sectional area in any plane transverse to said parallel sections.

2. A light guide as defined in claim 1, wherein said light guide is a prism light guide.

3. A light guide as defined in claim 2, wherein said cross-sectional shapes have vertices separated by a distance which does not exceed about three times the focal length of said shapes.

4. A light guide as defined in claim 3, wherein said first and second sections are joined along one or more seams.

5. A light guide as defined in claim 2, wherein said cross-sectional shapes have vertices separated by a distance which does not exceed about 2.5 times the focal length of said shapes.

6. A light guide as defined in claim 5, wherein said first and second sections are joined along one or more seams.

7. A light guide as defined in claim 2, wherein said first and second sections are joined along one or more seams.

8. A method of making a hollow light guide, said method comprising the steps of:

(a) forming light guide wall material into first and second light guide sections, each of said sections having substantially parabolic cross-sectional shape, said shape having substantially constant cross-sectional area in any plane transverse to said sections; and, (b) joining said first and second light guide sections together to overlappingly enclose a light guiding region while maintaining said parabolic cross-sectional shapes substantially confocal with one another.

9. A method as defined in claim 8, further comprising, during said joining step, maintaining between parabolic vertices of said shapes a separation distance which does not exceed about three times the focal length of said shapes.

10. A method as defined in claim 9, wherein said light guide is a prism light guide and said wall material is prismatic wall material.

11. A method as defined in claim 8, further comprising, during said joining step, maintaining between parabolic vertices of said shapes a separation distance which does not exceed about 2.5 times the focal length of said shapes.

12. A method as defined in claim 11, wherein said light guide is a prism light guide and said wall material is prismatic wall material.

13. A method as defined in claim 8, wherein said light guide is a prism light guide and said wall material is prismatic wall material.

* * * * *

UNITED STATES PATENT AND TRADEMARK OFFICE
CERTIFICATE OF CORRECTION

PATENT NO    : 5,715,347
DATED        : 3 February, 1998
INVENTOR(S)  : Lorne A. Whitehead It is certified that error appears in the above-identified patent and that said Letters Patent is hereby corrected as shown below:

In the legend portion of drawing Figure 8, change the symbol "◇" to the immediate left of the words "confocal parabolic cross section" to the symbol --☐--.

In the legend portion of drawing Figure 8, change the symbol "☐" to the immediate left of the words "circular cross section" to the symbol --◇--.

Signed and Sealed this

Fourteenth Day of July, 1998

Attest:

BRUCE LEHMAN

*Attesting Officer*    *Commissioner of Patents and Trademarks*